Dec. 8, 1931.  C. E. FENDORF  1,835,480
DETACHABLE AND FOLDING LUGGAGE CARRIER
Filed July 27, 1929  2 Sheets-Sheet 1

Inventor
C. E. Fendorf
By Frederic B. Wright
Attorney

Dec. 8, 1931.  C. E. FENDORF  1,835,480
DETACHABLE AND FOLDING LUGGAGE CARRIER
Filed July 27, 1929 2 Sheets-Sheet 2
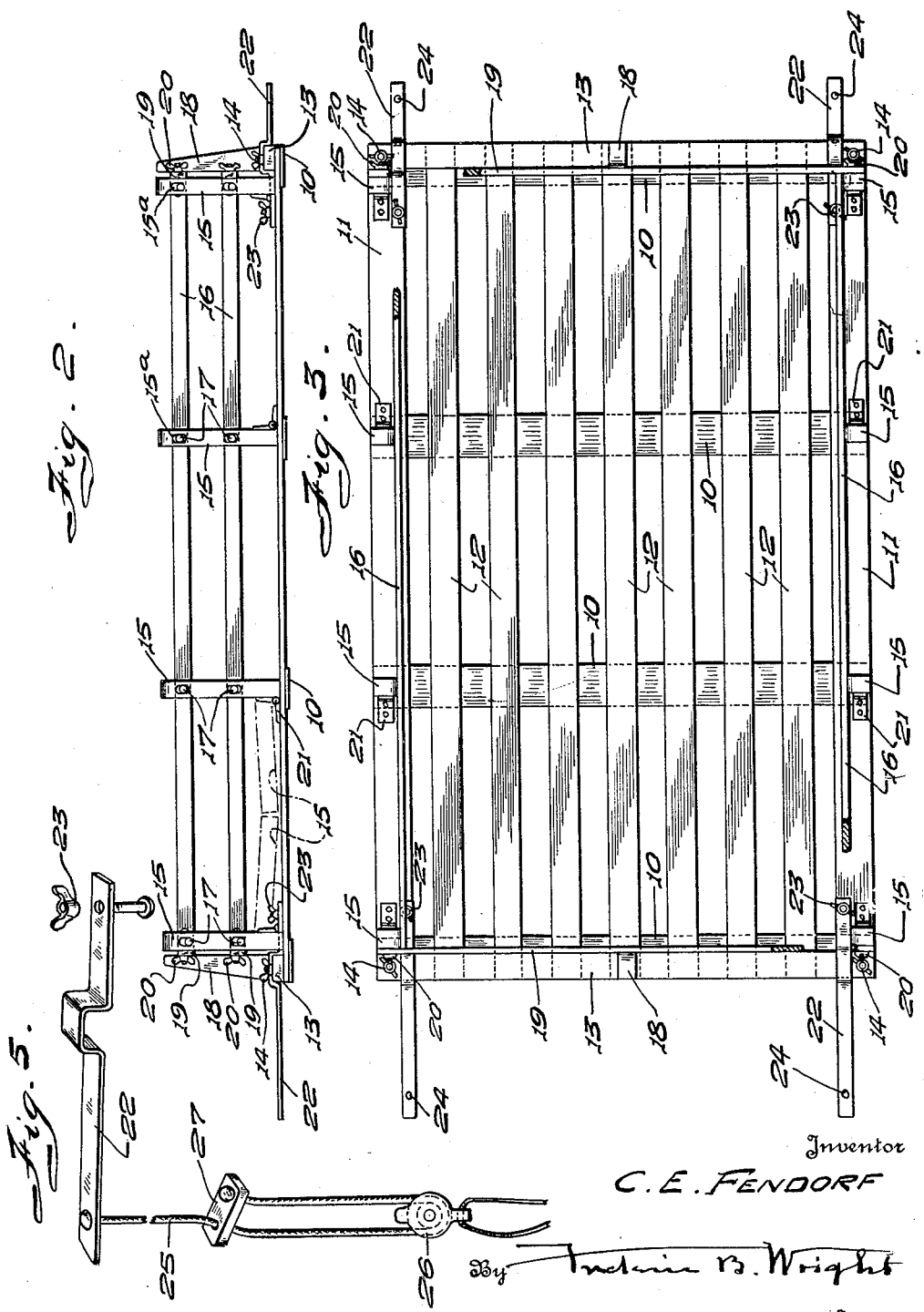
Inventor
C. E. FENDORF
By Frederick B. Wright
Attorney Patented Dec. 8, 1931

1,835,480

UNITED STATES PATENT OFFICE

CHARLES E. FENDORF, OF TUSCUMBIA, MISSOURI

DETACHABLE AND FOLDING LUGGAGE CARRIER

Application filed July 27, 1929. Serial No. 381,558.

This invention relates to luggage carriers for automobiles and particularly to a luggage carrier in the form of a roof floor designed to be placed upon the top of such automobiles as carry a large number of passengers and travel long distances though the invention is not restricted to these.

One of the objects of the invention is to provide a very simple device of this character which may be disposed over the roof or top of the automobile and attached thereto without the necessity of boring any holes through the top or roof, inserting any bolts or marring the surface of the automobile.

Another object of this invention is to provide a device of this character which is to a certain extent flexible so that it fits the curvature of the automobile top and so that it may be rolled up or folded up and stored in one corner of a garage in a relatively compact bundle or inside of the car.

A further object is to provide a device of this character which may be used to carry the luggage, ordinarily carried on the inside of the car, or the running boards thereof, thus eliminating the inconvenience of blocking up the doorways or in getting in and out.

A further object is to provide particularly advantageous means whereby the luggage carrier may be held in position upon the top of the car.

Other objects will appear in the course of the following description.

My invention is illustrated in the accompanying drawings, wherein:—

Figure 2 is a side elevation of the luggage carrier;

Figure 3 is a top plan view thereof;

Figure 5 is a perspective view of one of the spring irons used in connection with the body of the automobile;

Referring to these drawings, it will be seen that the luggage carrier consists of a plurality of transverse strips 10 of canvas webbing or other suitable flexible material preferably textile. Mounted upon these canvas strips and attached thereto in any suitable manner are the side boards 11 which rest upon the ends of the canvas strips and the intermediate, longitudinally extending boards 12. These boards have a length approximately that of the top of the automobile and the canvas strips 10 have a length approximately equal to the width of the automobile top.

Figure 6:
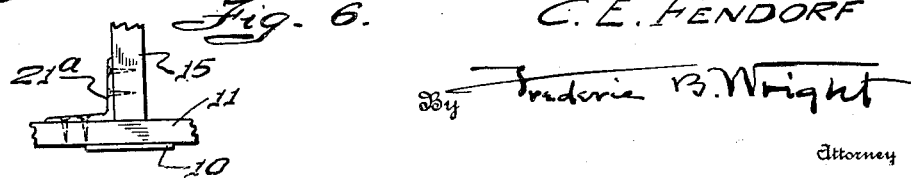
Figure 6 is a fragmentary elevation showing a modified manner of connecting one of the uprights to the side boards.

Detachably engaged with the ends of the longitudinal side boards 11 and extending over the tops of the boards 12 are the cross members 13 which are preferably bolted to the boards 11 by means of wing nuts and bolts 14 though I do not wish to be limited to this. Mounted upon the boards 11 at intervals and extending up therefrom are a plurality of uprights 15 and I have shown four of these uprights on each side, though, of course, any number may be used. These uprights are connected to the boards 11 by means to be later stated and carry upon them the longitudinally extending rails 16 held in place by the bolts 17. Mounted upon the cross pieces 13 at the middles thereof are the uprights 18 to which transverse rails 19 are bolted or otherwise attached. Bolts 20 pass through the ends of these rails 19 and through the end uprights 15 whereby these rails 19 which constitute the end frames of the luggage carrier are detachably connected to the posts 15, with the rails 16 constituting the side frame of the luggage carrier. The uprights 15 may be connected to the boards 11 in any suitable manner and they may be either hinged to the boards 11 by a hinge 21 as shown in Figure 2 or held rigidly connected thereto by an angle iron 21ª as in Figure 6. If the uprights 15 are hinged to the board 11, it is possible to fold the side frames downward toward the board 11. Of course, if angle irons are used, this is impossible.

It will be seen that with this construction when the bolts 20 are removed and the bolts 14 removed, each end frame formed of the cross piece 13, the uprights 18 and the rails 100

19 may be detached and then the floor formed of the boards 11 and 12 may be folded by reason of the flexibility of the canvas strips 10 into compact form for storage. Of course, if the posts 15 are hinged so as to be folded down, the bundle will be more compact than if the members 15 are rigid with the boards 10.

Figure 1:
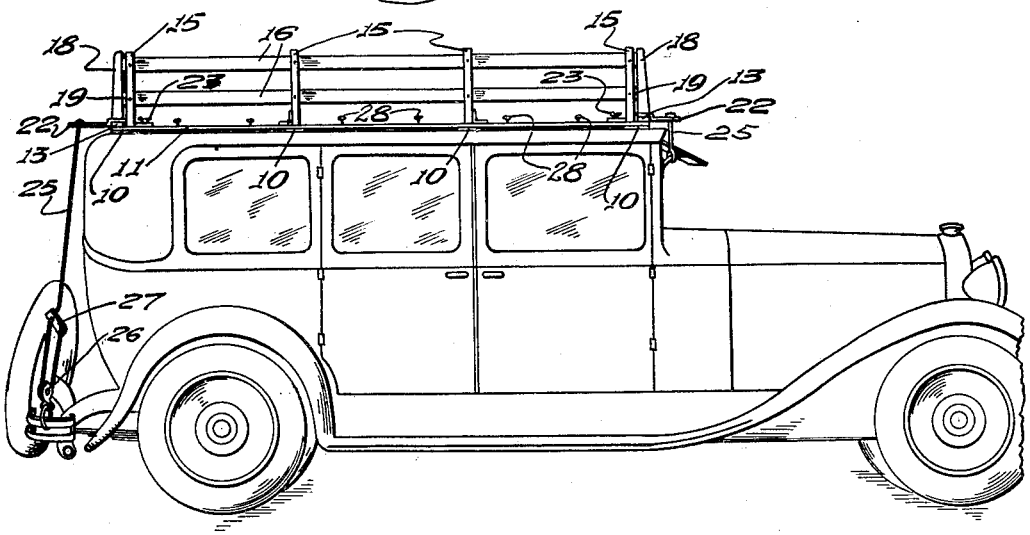
Figure 1 is a side elevation of a machine equipped with my improved luggage carrier.
Figure 4:
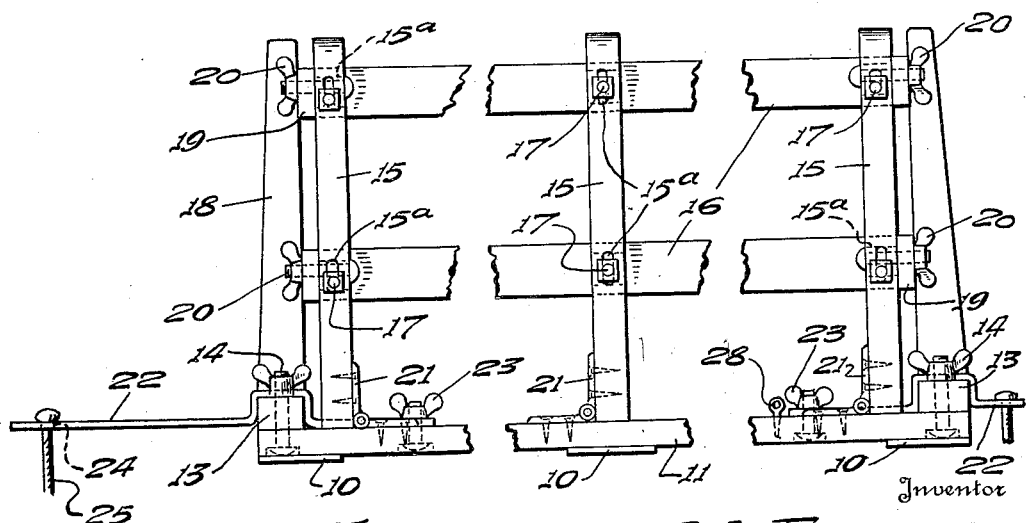
Figure 4 is a fragmentary enlarged side elevation partly broken away.

For the purpose of holding the luggage carrier upon the roof of the automobile without damaging the roof in any way and without the necessity of boring holes in the roof, I preferably provide at the front and rear the outwardly extending metallic strips or spring irons designated 22. The inner end of each iron is attached to the corresponding board 11 by means of a bolt having a wing nut designated 23 and the iron is bent so as to extend over the cross piece 13 and then extend on outward and at its end the iron is provided with an opening 24 through which a cord 25 passes, this cord being knotted or otherwise formed so that its end will not pass through the opening 24. The free end of this cord is attached to the sunshade bracket by any suitable means while at the rear end, the cord 25 extends downward and over a pulley 26 and upward to an ordinary wooden clamp 27 through which the cord 25 passes as shown in Figure 1, this wood clamp being of the type ordinarily used for tightening tent ropes or the like. By pulling upon this clamp, the rope 25 may be tightened to any desired extent. The pulley 26 is engaged with the rear fenders of the car or with any other convenient projection from the chassis of the car by means of wires or ropes or in any other suitable manner. The front cords 25 may also be provided with means whereby the tension may be taken up so that the luggage carrier will be held firmly in place. It will be noted that the irons 22 are so attached by the bolts 23 to the members 11 that they may be swung inward to lie entirely within the limits of the luggage carrier so as to permit the luggage carrier to be folded into a compact bundle without these irons projecting out therefrom. These irons are preferably made of tempered spring steel for the reason that the ordinary wrought iron would bend and stay bent with a very slight pull upon it and cast iron would be liable to break, while tempered steel will withstand considerable pull without bending much and will regain its shape when the pressure is removed. These spring irons permit the luggage carrier to be attached to the top of a car without using bolts or screws through the top of the car and inasmuch as these spring irons project beyond the roof of the car, it is an easy matter to secure a straight downward pull upon the luggage carrier which will hold it in place without the necessity of holding it in place by cables, straps or cords which will extend upward over the edges of the roof and then horizontally over the roof which would be very liable to chafe the roof. With this construction, there is no danger of chafing the roof while at the same time the luggage carrier is held firmly in place thereon with a spring therethrough which yields sufficiently when the car is subjected to stresses which tend to deform the roof or shift the car relative to the chassis. It will be seen that these spring irons constitute elements projecting from the luggage carrier beyond the car, thus permitting, as before stated, cables or other connections to be attached which will draw directly downward upon the luggage carrier without injuring the roof of the car or chafing it.

While preferably I use a spring iron 22 at the forward end of the automobile top and a spring iron 22 also at the rear end, these irons projecting out some little distance beyond the top in order to secure resiliency, I do not wish to be limited to this, as the irons might be relatively short and attached to the carrier in any suitable manner and if these irons are short, they would, under these circumstances, not have the resilience of the relatively long spring irons.

Where these springs irons 22 are used, the bolts 14 might under some circumstances be omitted, the spring irons acting to hold the cross pieces 13 in place upon the boards 11.

It will be seen that this luggage supporting frame or carrier may be attached to the top of the car without marring the car in any way and without in any way changing the structure of the car and that the canvas will cause the luggage carrier to conform to the transverse curvature of the car, the cross pieces 13 bending to suit this curvature when the luggage is placed within the rack or carrier.

Preferably hooks or eyelets 28 will be disposed at intervals along the boards 11 for the attachment of the canvas covering, not shown, which may be drawn over the luggage in the carrier and then tied at these hooks. Obviously a larger amount of luggage may be stored upon this luggage carrier than upon the running board of an automobile and at the same time the luggage may be more effectively protected from the weather and without any inconvenience such as is due to the obstruction caused by luggage placed upon the running board and obstructing the doors and the entrance or exit of passengers.

By using the spring irons 22, the cords 25 may be kept clear of the top of the car and will not chafe the finish, though it will be understood that felt pieces might be placed beneath the cords where they touch the car and thus no damage caused to the automobile.

It is of course, to be understood that the cross pieces 13 are sufficiently flexible to conform to any transverse curvature of the car top particularly as there is rarely more than three-fourths inch transverse curvature in the car top.

The bolts 17 preferably pass through adjustment slots 15ª in the uprights 15, these slots being about an inch and a half in length and the bolts 20 which connect the cross pieces 19 to the uprights 15 also pass through like adjustment slots in the members 15 and the uprights 18. Thus the rail 16 and the rails 19 may be vertically adjusted. These adjustments permit of the device being flexible enough to conform to the longitudinal and transverse curvatures of the upper surface of the car top. Not many cars have more than one and a half inch curve longitudinally but if more curve is necessary, the entire side frame can be bent to some extent. If the carrier, however, be used altogether on one particular car, it would not be necessary to have any adjustment slots but the bottom side members 11 could be bent to the curvature of the car top and then the side rails 16 could be fastened by screws to the corner posts. The adjustment slots, however, are an advantage when rolling up the carrier. The wing nuts 17 can be loosened and this will permit the bottom member 11 to assume a straight position, after having been flexed to fit the curvature of the car top, which permits the carrier to roll up into a neater bundle than when the members are curved, but the carrier will roll up even though the membes 11 are curved.

Another advantage in having adjustment slots in the corner posts 15 and the posts 18 is that the side rails 16 and end rails 19 can be made to match where they meet at the corner posts, thus securing a more symmetrical appearance than if the end rails were dropped below or raised above the side rails.

While I have illustrated in Figure 2 the hinges 21 as being disposed alternately in opposite directions, I do not wish to be limited to this as all but one end hinge might be disposed in the same direction.

Also by removing the bolts 17 from this corner post, this corner post could be bolted flatdown and all the other corner posts would swing in opposite directions with the rails attached thereto and then the sides will fold down until the rails 16 contact with each other, thus making a compact bundle.

While I have referred to the elements 10 as being canvas belting, I do not wish to be limited to this as I may use rubber belting having canvas threads therethrough. This prevents the webs from shrinking when wet.

While I have illustrated certain details of construction and arrangement of parts, I do not wish to be limited thereto as many minor changes might be made without departing from the spirit of the invention as defined in the appended claims.

It will, of course, be understood that with this construction, it will be possible to use a canvas cover which may extend entirely over the luggage disposed within the carrier and thus the luggage can be readily protected and much more effectively protected from the weather and from dust, than if the luggage were carried on the running boards. It will likewise be obvious that the luggage is supported out of contact with the roof itself but the luggage will rest upon the longitudinal boards 12 and thus will not mar or scratch the top. If the luggage is too heavy to be lifted over the rails at the side and ends of the luggage carrier, the rear or front rails may be removed and thus the luggage may be very readily handled either in removing it from the luggage carrier or placing it thereon.

I claim:—

1. A luggage carrier for automobile roofs including transversely extending webs of flexible material, side boards mounted upon the ends of said webs and extending at right angles thereto, floor boards mounted at intervals upon said webs and attached thereto and extending parallel to the side boards, posts mounted upon the side boards and having rails, and end frames detachably mounted upon the floor boards and side boards and detachably engaged with the adjacent posts.

2. A luggage carrier constituting a floor for automobile roofs including longitudinally extending laterally spaced floor boards, transversely extending spaced strips of soft material flexibly disposed beneath the boards and connecting the boards to each other whereby the boards may be folded in parallel relation when not in use, the side floor boards carrying side frames, and end frames detachably supported upon the ends of the floor boards and detachably engaged with the side frames and means for holding the carrier engaged with the roof of an automobile.

3. A luggage carrier for automobiles including transversely extending webs of fabric, longitudinally extending floor boards attached thereto and including side boards, uprights hinged to the side boards, rails pivotally mounted upon said uprights whereby the uprights may be turned to a lowered position when folded, and end frames detachably engaged with the adjacent uprights.

4. A luggage carrier constituting a floor for an automobile roof including transversely extending spaced webs of soft, flexible material, longitudinal spaced floor boards attached to the upper faces of said webs and disposed at right angles thereto whereby the floor boards may be folded upon each other when out of use, the upwardly extending side frames co-extensive with and mounted upon the side floor boards and foldable therewith.

5. A luggage carrying floor for an automobile roof including longitudinal spaced floor boards and transversely extending, spaced webs of soft flexible material to which the floor boards are attached and upon which they rest whereby the floor boards may be folded into parallel relation when not in use, and side and end frames adapted to be mounted upon the floor boards.

6. A luggage carrying floor for an automobile roof including transversely extending, relatively soft, flexible webs, longitudinally extending floor boards extending at right angles to the webs attached to the upper faces of said webs whereby the floor boards may be folded upon each other when not in use, side frames mounted upon the side floor boards and end frames detachably supported upon the ends of the floor boards and detachably engaged with the side frames.

7. A luggage carrier constituting a floor for an automobile roof including transversely extending flexible webs, side boards attached to the ends of said webs, floor boards extending parallel to the side boards and attached to said webs, uprights mounted upon the side boards, and including corner posts, longitudinal rails connected to said uprights, cross pieces adapted to rest upon the floor boards and side boards, uprights mounted upon said cross pieces, rails on the last named uprights, and means for detachably connecting said transverse rails to the corner posts whereby to permit the cross pieces and transverse rails to be removed from their engagement with the floor boards and uprights of the carrier and the carrier to be folded.

8. A luggage carrier constituting a floor for an automobile roof including transversely extending flexible webs, side boards attached to the ends of said webs, floor boards extending parallel to the side boards and attached to said webs, uprights mounted upon the side boards and including corner posts, longitudinal rails connected to said uprights, cross pieces detachably engaged with the ends of the side boards, uprights on said cross pieces, transversely extending rails mounted upon said uprights, and means for detachably connecting the transversely extending rails to the corner posts whereby to permit the cross pieces and transverse rails to be removed from their engagement with the floor boards and uprights of the carrier and the carrier to be folded.

9. A luggage carrier constituting a floor for an automobile roof including transversely extending flexible webs, side boards attached to the ends of said webs, floor boards extending parallel to the side boards and attached to said webs, uprights mounted upon the side boards and including corner posts, longitudinally extending rails connected to said uprights for vertical adjustment, cross pieces adapted to rest upon the ends of the floor boards and side boards and detachably engaged therewith, uprights carried by said cross pieces, rails mounted upon said uprights for vertical adjustment, and means for detachably connecting said transverse rails to the corner posts for vertical adjustment with relation thereto.

10. A luggage carrier constituting a floor for the roof of an automobile and adapted to rest upon the top of the automobile, means for holding the luggage carrier in place including members projecting beyond the luggage carrier and adapted to extend beyond the automobile roof, cords passing through the ends of said members and having means whereby they may be engaged with the automobile and tightened to hold the luggage carrier in place.

11. A luggage carrier constituting a floor for the roof of an automobile including longitudinally extending floor boards flexibly connected to each other, and means for holding the luggage carrier in place upon the roof including resilient irons attached to the floor boards and projecting beyond the same and adapted to project beyond the roof of the automobile, bolts pivotally connecting said irons to the floor boards whereby the irons may be turned inward upon the floor boards to permit the floor boards to be folded upon each other and cords passing through the ends of the irons and having means whereby they may be engaged with the automobile and tightened to hold the luggage carrier in place.

12. A luggage carrying floor for an automobile roof including parallel floor boards spaced from each other, a plurality of spaced webs of flexible relatively soft fabric disposed beneath the floor boards and extending at right angles thereto and to which the floor boards are attached, the webs flexibly connecting the floor boards to each other and protecting the roof of the automobile from contact with the floor boards, the floor boards being thus foldable upon each other, and means engaged with the automobile for holding the luggage carrier and floor in place upon the automobile roof.

In testimony whereof I affix my signature.

CHARLES E. FENDORF.